United States Patent
Yuasa et al.

(10) Patent No.: US 9,428,230 B2
(45) Date of Patent: Aug. 30, 2016

(54) SPOILER DEVICE

(71) Applicant: AISIN SEIKI KABUSHIKI KAISHA, Kariya-shi, Aichi-ken (JP)

(72) Inventors: Daisuke Yuasa, Toyoake (JP); Kenji Hori, Toyota (JP); Tokuhiro Shiga, Anjo (JP); Yoshimasa Asano, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/751,607

(22) Filed: Jun. 26, 2015

(65) Prior Publication Data

US 2015/0375809 A1 Dec. 31, 2015

(30) Foreign Application Priority Data

Jun. 30, 2014 (JP) ................... 2014-133457

(51) Int. Cl.
*B62D 35/00* (2006.01)
*B62D 37/02* (2006.01)

(52) U.S. Cl.
CPC ............. *B62D 37/02* (2013.01); *B62D 35/007* (2013.01)

(58) Field of Classification Search
CPC .. B62D 35/00; B62D 35/005; B62D 35/007; B62D 37/02
USPC .......................................... 296/180.1, 180.5
See application file for complete search history.

(56) References Cited

U.S. PATENT DOCUMENTS

| | | | | |
|---|---|---|---|---|
| 5,112,095 A * | 5/1992 | Lund | .................... | B62D 35/005 296/180.5 |
| 5,165,751 A * | 11/1992 | Matsumoto | .......... | B62D 35/007 296/180.5 |
| 6,130,028 A * | 10/2000 | McGuckin | ........... | G03C 7/3046 430/463 |
| 9,132,868 B2 * | 9/2015 | Shiga | ..................... | B62D 37/02 |
| 2004/0256885 A1 * | 12/2004 | Bui | ...................... | B62D 35/007 296/180.5 |
| 2007/0145776 A1 * | 6/2007 | Grave | .................. | B62D 35/007 296/180.5 |
| 2009/0284043 A1 * | 11/2009 | Molnar | ................ | B62D 35/007 296/180.5 |
| 2011/0285168 A1 * | 11/2011 | Roemer | ............... | B62D 35/007 296/180.5 |
| 2014/0076645 A1 * | 3/2014 | McDonald | ........... | B62D 35/005 180/68.1 |
| 2014/0346810 A1 * | 11/2014 | Wild | .................... | B62D 35/007 296/180.5 |
| 2015/0091325 A1 * | 4/2015 | Shiga | .................. | B62D 35/007 296/180.1 |
| 2015/0175223 A1 * | 6/2015 | Jeong | .................. | B62D 35/007 296/180.5 |

FOREIGN PATENT DOCUMENTS

DE 10 2011 081 899 A1 2/2013

* cited by examiner

*Primary Examiner* — Gregory Blankenship
(74) *Attorney, Agent, or Firm* — Finnegan, Henderson, Farabow, Garrett & Dunner, LLP

(57) ABSTRACT

A spoiler device includes a movable spoiler for a vehicle, the movable spoiler being movable between a retracted position and a deployed position, a link mechanism supporting the movable spoiler, a torsion bar connected to the link mechanism, and an actuation portion rotating the torsion bar.

14 Claims, 7 Drawing Sheets

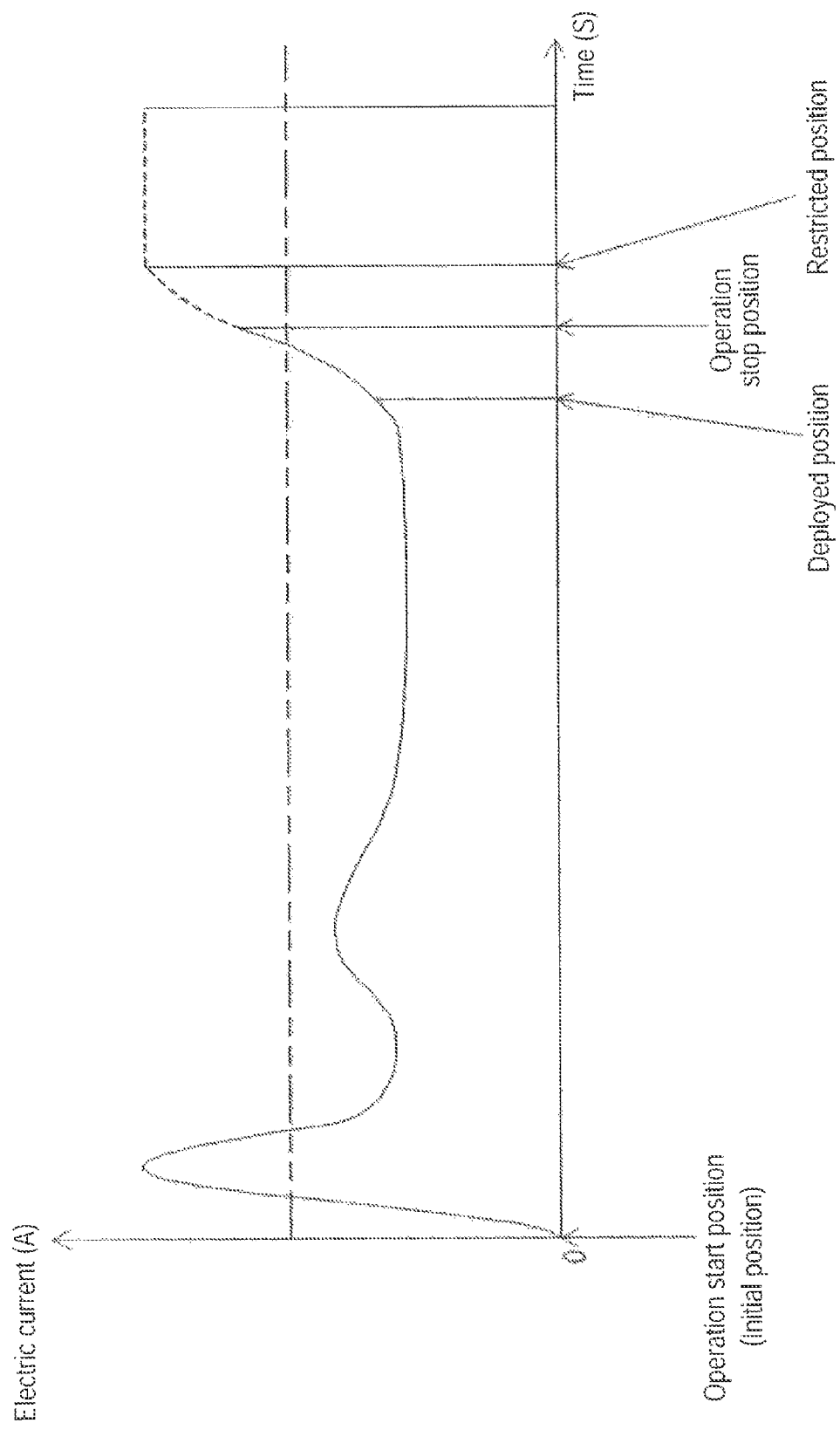

SPOILER DEVICE

CROSS REFERENCE TO RELATED APPLICATIONS

This application is based on and claims priority under 35 U.S.C. §119 to Japanese Patent Application 2014-133457, filed on Jun. 30, 2014, the entire content of which is incorporated herein by reference.

TECHNICAL FIELD

This disclosure generally relates to a spoiler device.

BACKGROUND DISCUSSION

A known actuation device that deploys and retracts a vehicle spoiler is disclosed in DE102011081899A (hereinafter referred to as Patent reference 1). The actuation device includes a motor, and an output from the motor is connected to, or inputted to a connecting element (four-bar linkage mechanism) that is disposed at each of a right hand portion and a left hand portion of a vehicle via a spindle mechanism. The spoiler is fastened to the four-bar linkage mechanism and is movable between a deployed position and a retracted position.

According to the construction of Patent reference 1, the connecting elements disposed at the right-hand and the left-hand of the vehicle maintains the position of the spoiler. Thus, the connecting element of Patent reference 1 requires a complex structure. Because of the complex structure, according to Patent reference 1, manufacturing costs increase and it is difficult to remove external objects, for example, dirt or sand, or the like that enters into the connecting element. Further, the entered external objects may degrade the sliding performance of the connecting element.

A need thus exists for a spoiler device which is not susceptible to the drawback mentioned above.

SUMMARY

In light of the foregoing, a spoiler device includes a movable spoiler for a vehicle, the movable spoiler being movable between a retracted position and a deployed position, a link mechanism supporting the movable spoiler, a torsion bar connected to the link mechanism, and an actuation portion rotating the torsion bar.

BRIEF DESCRIPTION OF THE DRAWINGS

The foregoing and additional features and characteristics of this disclosure will become more apparent from the following detailed description considered with the reference to the accompanying drawings, wherein:

FIG. 7 is a graph showing an operating current of the actuation portion.

DETAILED DESCRIPTION

Embodiments of the spoiler device will be explained with reference to illustrations of drawing figures as follows. According to the embodiment, up and down, or upward and downward correspond to an upward direction and a downward direction in gravity direction, respectively. A front side corresponds to a side where a driver's seat is positioned in a vehicle, and a rear side corresponds to a side opposite from the front side.

Figure 1:
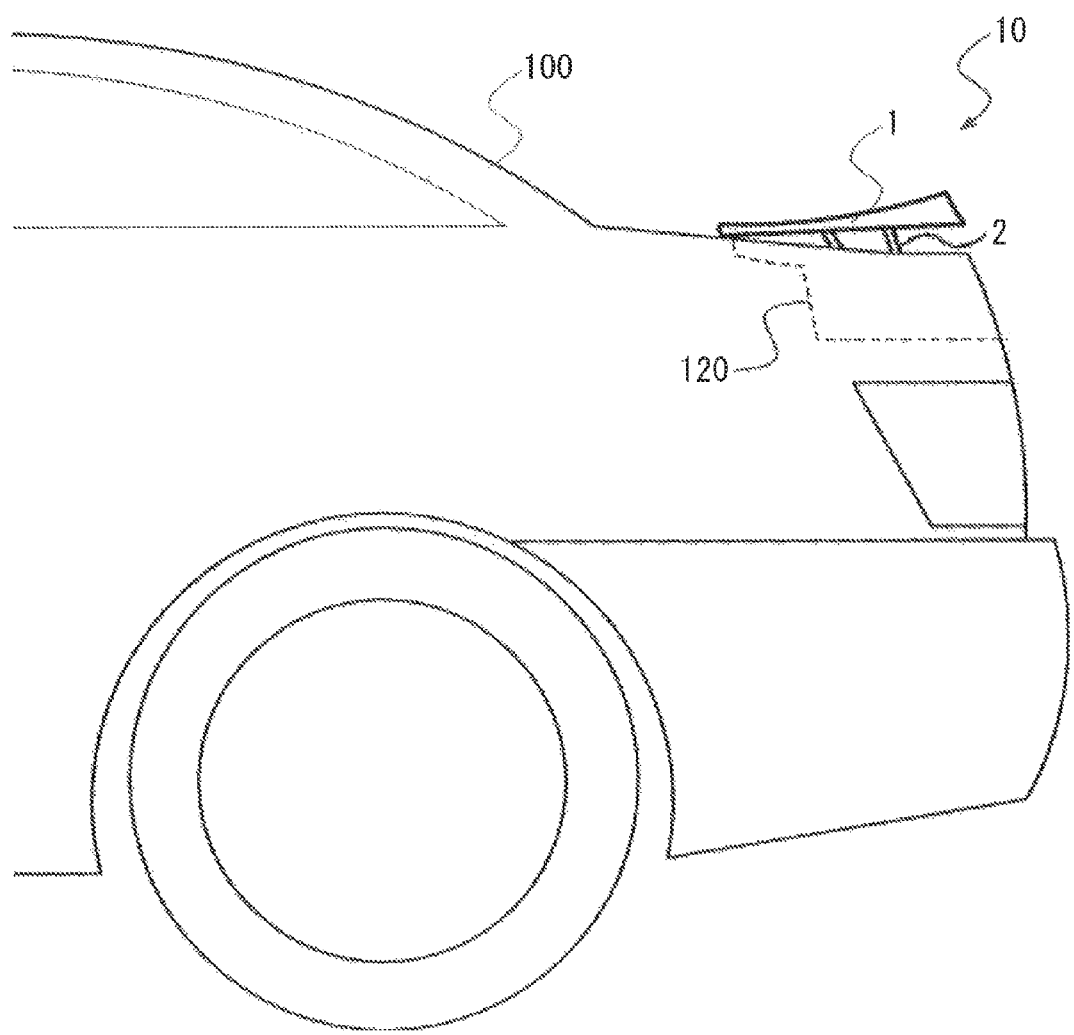
FIG. 1 is a schematic lateral view of a spoiler device mounted to a vehicle according to embodiments disclosed here.

First embodiment will be explained referring to FIG. 1 as follows. FIG. 1 shows a spoiler device 10 mounted at a rear side of a vehicle 100, and a movable spoiler 1 which is in a deployed state and a link mechanism 2 which supports the movable spoiler 1. In FIG. 1, a storage portion 120 is indicated with a dotted line.

The spoiler device 10 includes the movable spoiler 1 for a vehicle, the movable spoiler 1 being movable between a retracted position (stored position) and the deployed position, and an actuator 9 (see FIG. 2) for moving the movable spoiler 1. The movable spoiler 1 extends in a vehicle width direction of the vehicle 100 and can be stored (retracted) in the storage portion 120 provided at the rear side of the vehicle 100. The movable spoiler 1 is configured to move upward from the retracted position, or state (stored position, or state) where the movable spoiler 1 is stored in the storage portion 120 to the deployed position (deployment state) shown in FIG. 1 by means of the actuator 9.

The actuator 9 includes a pair of link mechanisms 2 which support the movable spoiler 1. The link mechanisms 2 serving as a pair are positioned at opposite end portions of the movable spoiler 1 in the width direction. The opposite end portions of the movable spoiler 1 are supported by the link mechanisms 2 serving as a pair via fixing portions, respectively. Further, the actuator 9 includes a rod 3 serving as a torsion bar connected to the link mechanism 2 and an actuation portion 4 for rotating the rod 3.

The actuation portion 4 is positioned between the link mechanisms 2 serving as a pair and is connected to the link mechanisms 2 via the rod 3. Further, the rod 3 is made from a rod member made of metal and opposite end portions of the rod 3 are connected to the link mechanisms 2, respectively. Upon the rotation of the rod 3 by the actuation portion 4, the movable spoiler 1 moves between the retracted position and the deployed position via the link mechanisms 2. Further, in order to make the stored movable spoiler 1 be unnoticeable, or inconspicuous in the stored state, a top surface of the movable spoiler 1 is formed to be substantially flush with (formed to substantially continues from) a top surface of a rear side body of the vehicle 100 at the retracted position.

Figure 2:
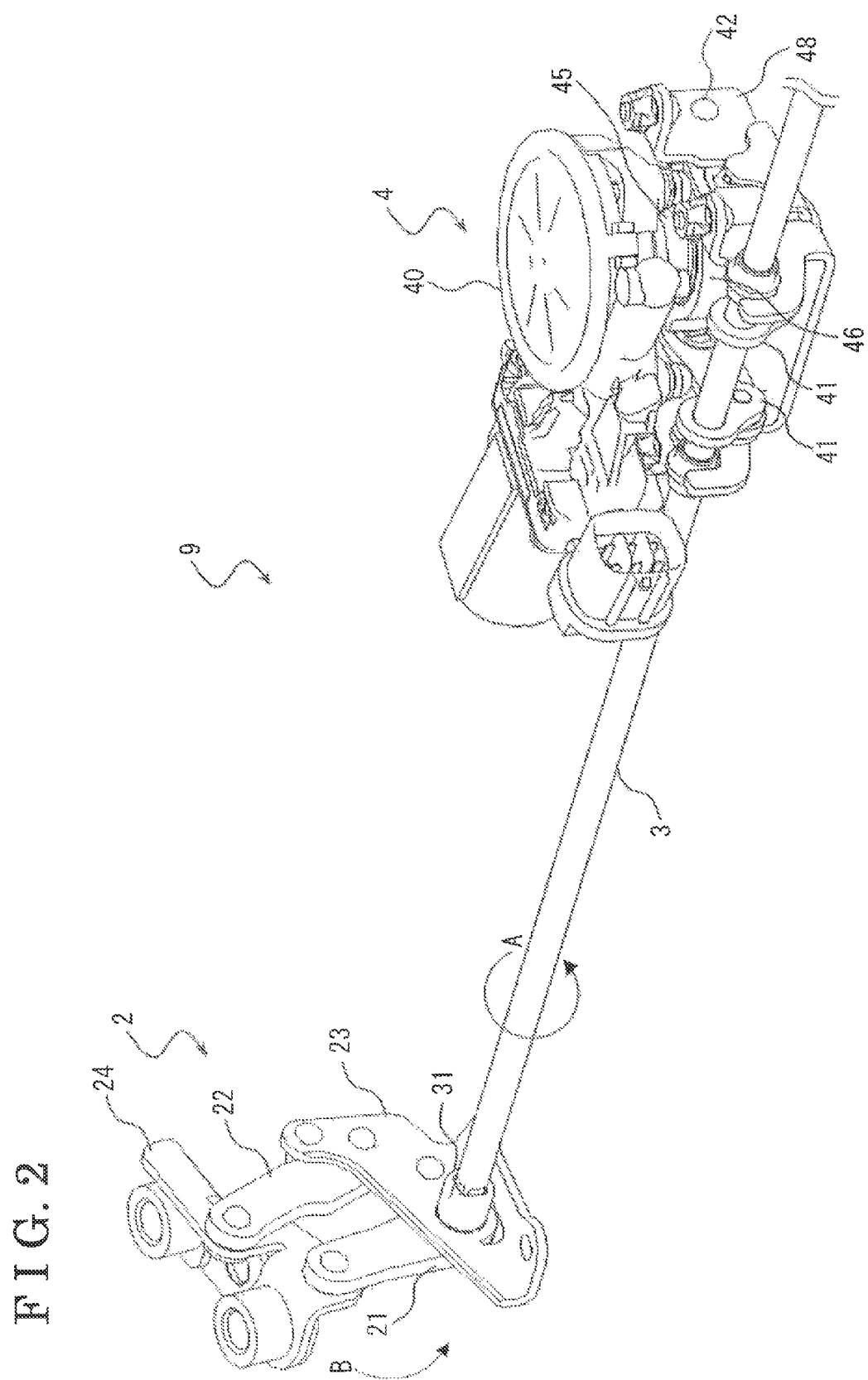
FIG. 2 is a schematic perspective view of a link mechanism and an actuation portion of an actuator.
Figure 3:
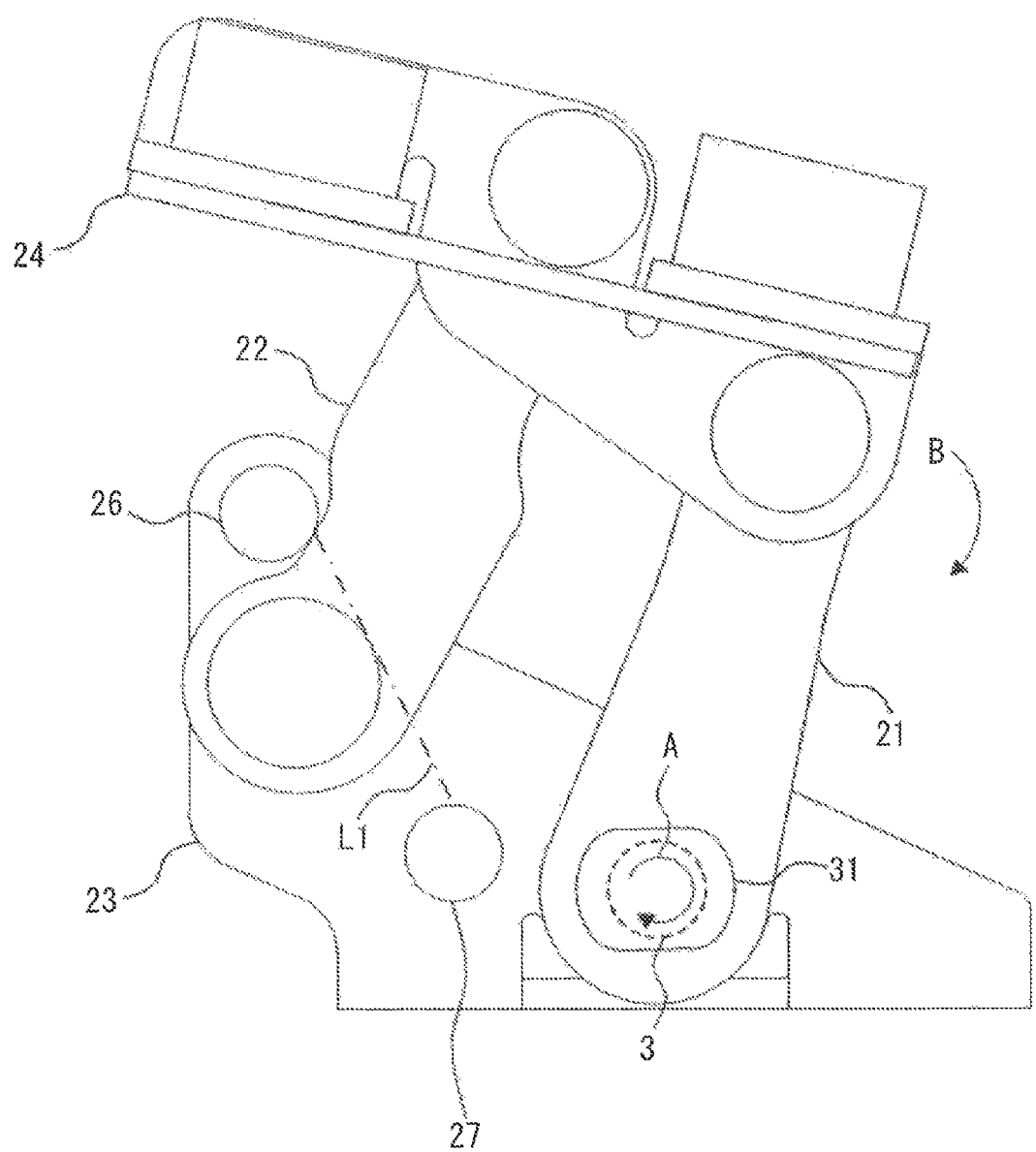
FIG. 3 is a schematic lateral view showing the link mechanism.

Constructions of the link mechanism 2 will be explained referring to FIGS. 2 and 3 as follows. FIG. 2 is an enlarged schematic perspective view which shows the link mechanism 2 and the actuation portion 4 of the actuator 9 in a state where the movable spoiler 1 is in the deployed position. FIG. 3 is a schematic lateral view of the link mechanism 2 shown in FIG. 2 and shows a lateral surface opposite from the side which faces the actuation portion 4 of the link mechanism 2.

The link mechanism 2 includes a driving link 21 connected to the rod 3 via a collar 31 and includes a driven link 22 which rotates, or pivots in accordance with a rotation or a pivotal movement of the driving link 21. Further, the link mechanism 2 includes a bracket 23 fixed to a body of the vehicle 100 by means of, for example, a bolt, and includes a connecting portion 24 connected to the movable spoiler 1 via a fixing portion. The driving link 21 and the driven link 22 are rotatably or pivotally connected to the bracket 23 and the connecting portion 24.

The rod 3 is provided with an engaging portion formed in a polygonal column shape that protrudes from each of opposite ends of the rod 3. The engaging portion is inserted to be positioned in an engagement hole formed on the collar 31. Further, the collar 31 is fixed to a lower portion of the driving link 21 by means of clinching, for example. Accordingly, upon the rotation of the rod 3, the driving link 21 rotates, or pivots via the collar 13. Further, an upper portion of the driving link 21 is connected to an upper portion of the driven link 22 via the connecting portion 24. Thus, upon the rotation, or pivotal movement of the driving link 21, the driven link 22 rotates, or pivots via the connecting portion 24. For example, upon the rotation of the rod 3 in an arrowed direction A, the movable spoiler 1 fixed to the connecting portion 24 rotates, or pivots in an arrowed direction B.

As illustrated in FIG. 3, the link mechanism 2 includes a first link stopper 26 which restricts the motion of the driven link 22 when moving the movable spoiler 1 from the retracted position to the deployed position. Further, the link mechanism 2 includes a second link stopper 27 which restricts the motion of the driven link 22 when moving the movable spoiler 1 from the deployed position to the retracted position. The first link stopper 26 and the second link stopper 27 protrude from a side surface of the bracket 23 in a direction being parallel to the extending direction of the rod 3. For an explanatory purpose, in FIG. 3, the position of the rod 3 is indicated with a dotted line.

The first link stopper 26 is disposed at an upper position relative to the second link stopper 27 while the driven link 22 is positioned between the first link stopper 26 and the second link stopper 27. Then, the first link stopper 26 contacts the driven link 22 in a state where the movable spoiler 1 is in the deployed position. That is, when the movable spoiler 1 reaches the deployed position, the first link stopper 26 comes to contact the driven link 22 to restrict the motion of the movable spoiler 1.

The second link stopper 27 is disposed at a lower position relative to the first link stopper 26 while the driven link 22 is positioned between the second link stopper 27 and the first link stopper 26. The second link stopper 27 contacts the driven link 22 in a state where the movable spoiler 1 is in the retracted position. That is, when the movable spoiler 1 reaches the retracted position, the second link stopper 27 comes to contact the driven link 22 to restrict the motion of the movable spoiler 1.

For example, in a case where the movable spoiler 1 which is in the deployed position rotates, or pivots, or pivotally moves in an arrowed direction B upon the rotation of the rod 3 in the arrowed direction A, the driven link 22 (see FIG. 3) rotates, or pivots, or pivotally moves in the arrowed direction B together with the movable spoiler 1 and the connecting portion 24. Thereafter, the second link stopper 27 comes to contact the driven link 22 to restrict the motion of the movable spoiler 1 at the retracted position.

In those circumstances, in a case where the actuation portion 4 further rotates the rod 3 after the movable spoiler 1 reaches the retracted position, the rod 3 serving as the torsion bar is twisted because the second link stopper 27 restricts the motion of the movable spoiler 1. Then, the repulsive force, or resilience of the rod 3 is applied to the driving link 21 in the arrowed direction A. Thus, even if an external force which is directed in a direction opposite from the arrowed direction B is applied to the movable spoiler 1 in the retracted position, the movable spoiler 1 is retained by the repulsive force, or resilience of the rod 3, thus restraining the movable spoiler 1 from moving.

On the other hand, when the rod 3 rotates in a direction being reversal from the arrowed direction A when the movable spoiler 1 is in the retracted position, the movable spoiler 1 rotates, or pivots in the direction being reversal from the arrowed direction B. Then, the driven link 22 rotates, or pivots in the direction being reversal from the arrowed direction B together with the movable spoiler 1 and the connecting portion 24. Thereafter, when the movable spoiler 1 reaches the deployed position, the first link stopper 26 comes to contact the driven link 22 to restrict the motion of the movable spoiler 1 at the deployed position.

Figure 4:
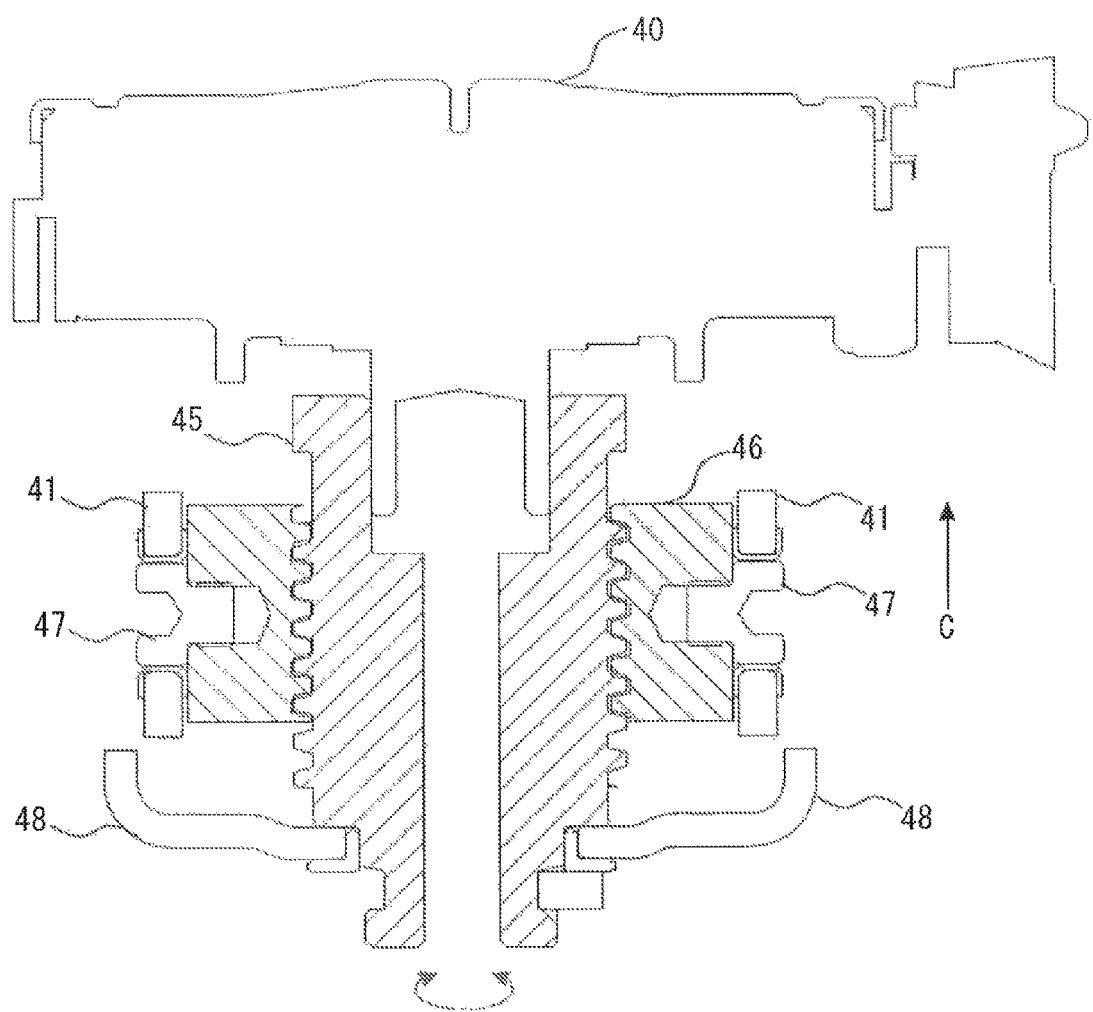
FIG. 4 is a schematic cross-sectional view showing the actuation portion.
Figure 5:
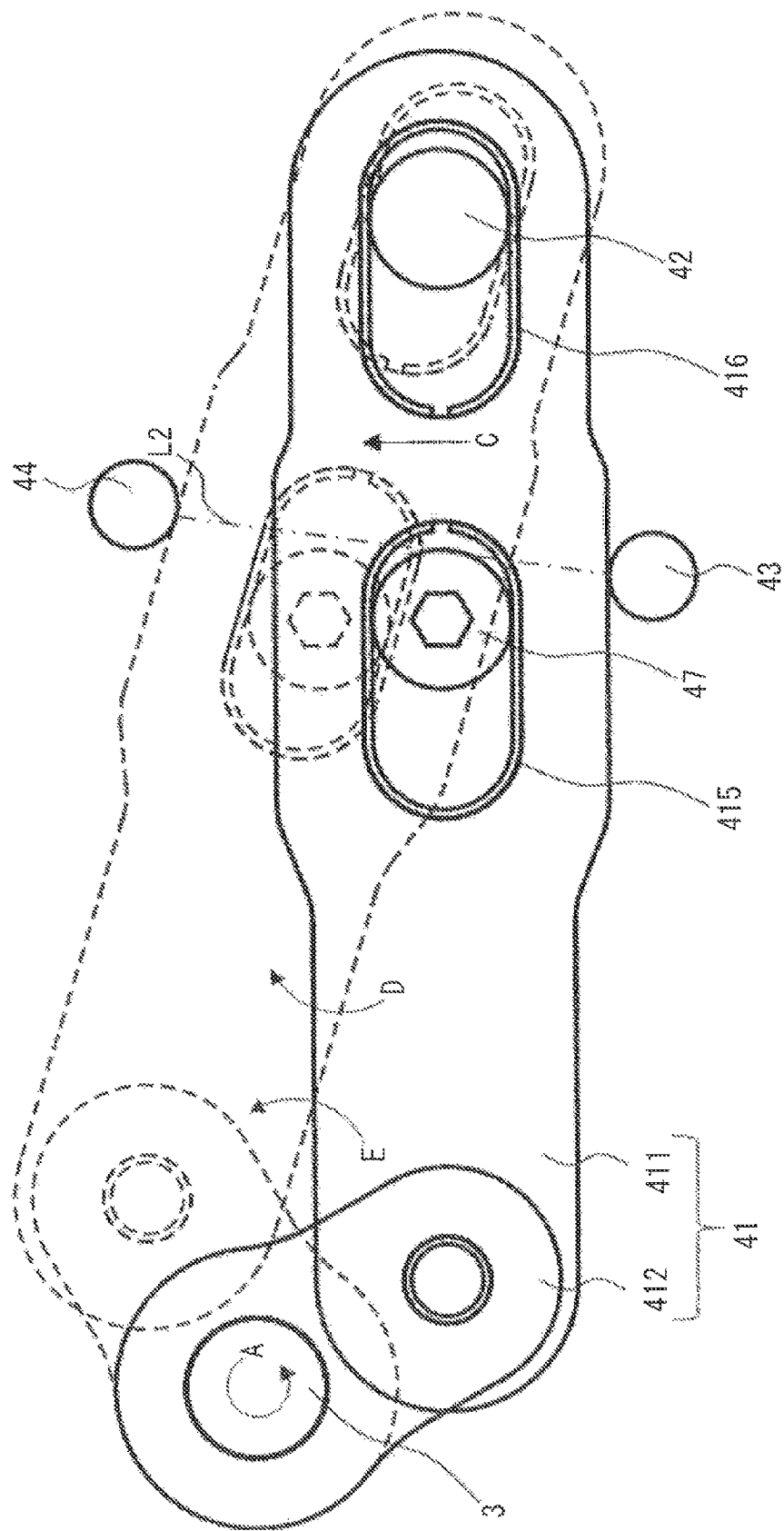
FIG. 5 is a schematic lateral view showing an arm of the actuation portion.

Next, the construction of the actuation portion 4 will be explained with reference to FIGS. 2, 4, and 5. FIG. 4 shows a cross-section of the actuation portion 4 along a direction being parallel with the extending direction of the rod 3. FIG. 5 is an explanatory view of the operation of an arm 41 and shows a lateral side of the arm 41.

As shown in FIG. 2, the actuation portion 4 includes a motor 40 serving as a drive source for rotating the rod 3, and a pair of arms 41 connected to the rod 3 and being movable between an initial position and a restricted position. Further, the actuation portion 4 includes a screw portion 45 and a nut portion 46 which serve as a reverse prevention portion for preventing a reversal movement of the rod 3. The motor 40 rotates the screw portion 45 to rotate about a rotation shaft. For example, a spindle bolt is applied as the screw portion 45. The nut portion 46 threadingly engaging the screw portion 45 moves in upward and downward directions along the rotation shaft of the screw portion 45.

As illustrated in FIG. 4, the screw portion 45 is formed in a substantially cylindrical shape and a thread groove is provided on an outer surface of the screw portion 45. Further, the nut portion 46 is formed in a substantially ring shape and a thread groove is provided on an inner surface of the nut portion 46. Pins 47 are fixed to the nut portion 46, and the nut portion 46 is connected to the arms 41 serving as a pair via pins, respectively. Thus, when the nut portion 46 moves in upward and downward directions, the arms 41 move between the initial position and the restricted position.

More particularly, the screw portion 45 that is rotatably supported relative to the body of the vehicle 100 via the frame 48 rotates in response to receiving the rotational force from the motor 40. Then, upon the rotation of the screw portion 45, the nut portion 46 threadingly engaging the screw portion 45 moves in upward and downward directions along the rotation shaft of the screw portion 45. For example, in a case where the screw portion 45 normally rotates (rotates in a normal direction), the nut portion 46 moves downward. Then, as described in detail hereinafter, the arms 41 pivotally move, pivot, or rotate about a shaft 42 to move in a downward direction from the initial position towards the restricted position. Thus, the rod 3 fixed to the arm 41 rotates in a direction reversal from the arrowed direction A in FIG. 2, and the movable spoiler 1 moves towards the deployed position. The movable spoiler 1 reaches the deployed position before the arms 41 reach the restricted position.

On the other hand, when the screw portion 45 rotates in a reversal direction, the nut portion 46 moves upward. Then, the arm 41 moves upward about the shaft 42 towards the initial position. Thus, the rod 3 to which the arm 41 is fixed rotates in the arrowed direction A in FIG. 2 and the movable spoiler 1 moves towards the retracted position. In those circumstances, when the movable spoiler 1 is positioned in the retracted position, the arm 41 is positioned in the initial position.

Then, the screw portion 45 and the nut portion 46 include a reverse prevention function so that the nut portion 46 does not rotate even if the force in upward and downward directions is applied to the nut portion 46. For example, in a case where a severe external stress, or load (strong external force) is applied to the movable spoiler 1 which is in the deployed position, the rod 3 is applied with the rotational force in the arrowed direction A in FIG. 5. Then, the force, or load is applied to the arm 41 in an arrowed direction E, and the force is applied to the nut portion 46 in the arrowed direction C via the pin 47. In those circumstances, even if the force, or load is applied to the nut portion 46, the screw portion 45 does not rotate. Thus, the rod 3 is prevented from rotating even if the external force, or load is applied to the movable spoiler 1. Accordingly, the movable spoiler 1 is securely retained at the deployed position.

Similarly, in a case where the severe external stress, or load (strong external force) is applied to the movable spoiler 1 which is in the retracted position, the rotational force is applied to the rod 3 in a direction being reversal from the arrowed direction A in FIG. 5. Then, the force in a direction being reversal from the arrowed direction E is applied to the arm 41 and the force in a direction being reversal from the arrowed direction C is applied to the nut portion 46. However, because the screw portion 45 does not rotate even in those circumstances, the rod 3 is restrained from rotating even if the external force, or load is applied to the movable spoiler 1.

Next, the operation of the arm 41 will be explained referring to FIG. 5. The operation of one of the arms 41 will be explained because the arms 41 serving as a pair operate in the same manner. FIG. 5 shows a lateral side of the arm 41 which is opposite from a side which faces the reverse prevention portion (screw portion 45 and nut portion 46). Further, in FIG. 5, the arm 41 which is in the restricted position is indicated with a solid line and the arm 41 which is in the initial position is indicated with a dotted line.

The arm 41 includes a main body portion 411 connected to the nut portion 46 and an end portion 412 rotatably, or pivotally connected to the main body portion 411. Then, the end portion 412 is fixed to the rod 3. Further, the arm 41 includes a first elongated hole 415 and is connected to the nut portion 46 via the pin 47 that is positioned in the first elongated hole 415. Further, the arm 41 includes a second elongated hole 416 and is rotatable, or pivotable about the shaft 42 which is positioned in the second elongated hole 416 between the restricted position and the initial position.

Further, the actuation portion 4 includes a first arm stopper 43 that comes to contact the arm 41 which is in the restricted position. Further, the actuation portion 4 includes a second arm stopper 44 that comes to contact the arm 41 which is in the initial position. Then, the first arm stopper 43 and the second arm stopper 44 are provided on an inner surface of a frame 48.

In a case where the movable spoiler 1 is moved from the deployed position to the retracted position, the nut portion 46 and the pin 47 move upwards in the arrowed direction C. Then, the main body portion 411 of the arm 41 connected to the nut portion 46 rotates, or pivots in an arrowed direction D about the shaft 42. Simultaneously, the end portion 412 rotates, or pivots in the arrowed direction E and the rod 3 rotates in the arrowed direction A. On the other hand, in a case where the movable spoiler 1 is moved from the retracted position to the deployed position, the nut portion 46 and the pin 47 move downward in a direction reversal from the arrowed direction C, and the main body portion 411 rotates, or pivots in a direction reversal from the arrowed direction D. Simultaneously, the end portion 412 rotates, or pivots in a direction reversal from the arrowed direction E, and the rod 3 rotates in a direction reversal from the arrowed direction A.

According to the embodiment, the position of the first arm stopper 43 is set so that the movable spoiler 1 reaches the deployed position before the arm 41 comes to contact the first arm stopper 43 when moving the movable spoiler 1 to the deployed position. Thus, even after the movable spoiler 1 reaches the deployed position and the driven link 22 (see FIG. 3) comes to contact the first link stopper 26, the rod 3 can be rotated by a predetermined amount. Accordingly, the rod 3 serving as the torsion bar is twisted, and the repulsive force, or resilience of the rod 3 is applied to the driving link 21 in a direction reversal from the arrowed direction A. Thus, even if an external force, or load is applied to the movable spoiler 1 retained at the deployed position, the movable spoiler 1 can be maintained by the repulsive force, or resilience of the rod 3. Accordingly, the movable spoiler 1 can be securely retained at the deployed position.

The first arm stopper 43 and the second arm stopper 44 define a movable range of the arm 41. That is, the arm 41 is movable from the initial position at which the arm 41 is in contact with the second arm stopper 44 to the restricted position at which the arm 41 is in contact with the first arm stopper 43. Further, the first link stopper 26 and the second link stopper 27 define a movable range of the driven link 22. That is, the driven link 22 is movable from the position where the driven link 22 is in contact with the first link stopper 26 to the position where the driven link 22 is in contact with the second link stopper 27.

Thus, in a case where the arm 41 is not in contact with the first arm stopper 43 when the movable spoiler 1 reaches the deployed position upon the contact of the driven link 22 to the first link stopper 26, the arm 41 can be further rotated, or pivoted to twist the rod 3. Then, the position of the first arm stopper 43 is set so that the rod 3 can be twisted.

Particularly, in FIG. 5, a distance L2 (indicated with a chain-dotted line) between the first arm stopper 43 and the second arm stopper 44 is set to be longer than a distance L1 (indicated with a chain-dotted line) between the first link stopper 26 and the second link stopper 27 in FIG. 3. More particularly, the distance L2, which is defined as the distance between the position of the first arm stopper 43 which the main body portion 411 comes to contact and the position of the second arm stopper 44 which the main body portion 411 comes to contact, is defined to be longer than the distance L1 between the first link stopper 26 and the second link stopper 27.

Similarly, even after the driven link 22 (see FIG. 3) comes to contact the second link stopper 27 because the movable spoiler 1 reaches the retracted position when moving the movable spoiler 1 from the deployed position to the retracted position, the rod 3 may be rotated by a predetermined amount. Accordingly, the rod 3 serving as the torsion bar is twisted and the repulsive force, or the resilience of the rod 3 directed in the arrowed direction A is applied to the driving link 21. Thus, even if the external force, or load is applied to the movable spoiler 1 retained in the retracted position, the movable spoiler 1 can be retained by means of the repulsive force, or resilience of the rod 3. In this case, the position of the second arm stopper 44 is set so that the movable spoiler 1 reaches the retracted position before the arm 41 comes to contact the second arm stopper 44 when moving the movable spoiler 1 to the retracted position.

According to the spoiler device of the first embodiment, connecting structures of the movable spoiler 1 and the actuator 9 (link mechanism 2, rod 3 and actuation portion 4) can be simplified. Thus, the spoiler device can be readily manufactured and the manufacturing cost can be reduced. Further, because external objects which unintentionally entered can be readily removed, the sliding performance of the link mechanism 2 can be restrained from being degraded.

Further, even if the external force, or load is applied to the movable spoiler 1 the movable spoiler 1 can be securely maintained in the deployed position by the repulsive force, or resilience of the rod 3. Further, even if the external force, or load is applied to the movable spoiler 1, the movable spoiler 1 can be securely retained at the retracted position and the deployed position by means of the reverse prevention portion.

According to an alternative construction, instead of the screw portion 45 and the nut portion 46, the reverse prevention portion may include a worm gear mechanism. In this case, a worm which is connected to an output shaft of the motor 40 and a worm wheel which is meshed with the worm may be provided and a thread groove may be formed on the shaft 42 of the arm 41 to be meshed with the worm wheel. Then, the arm 41 is fixed to the shaft 42 and the arm 41 rotates, or pivots together with the rotation of the worm wheel and the shaft 42.

Figure 6:
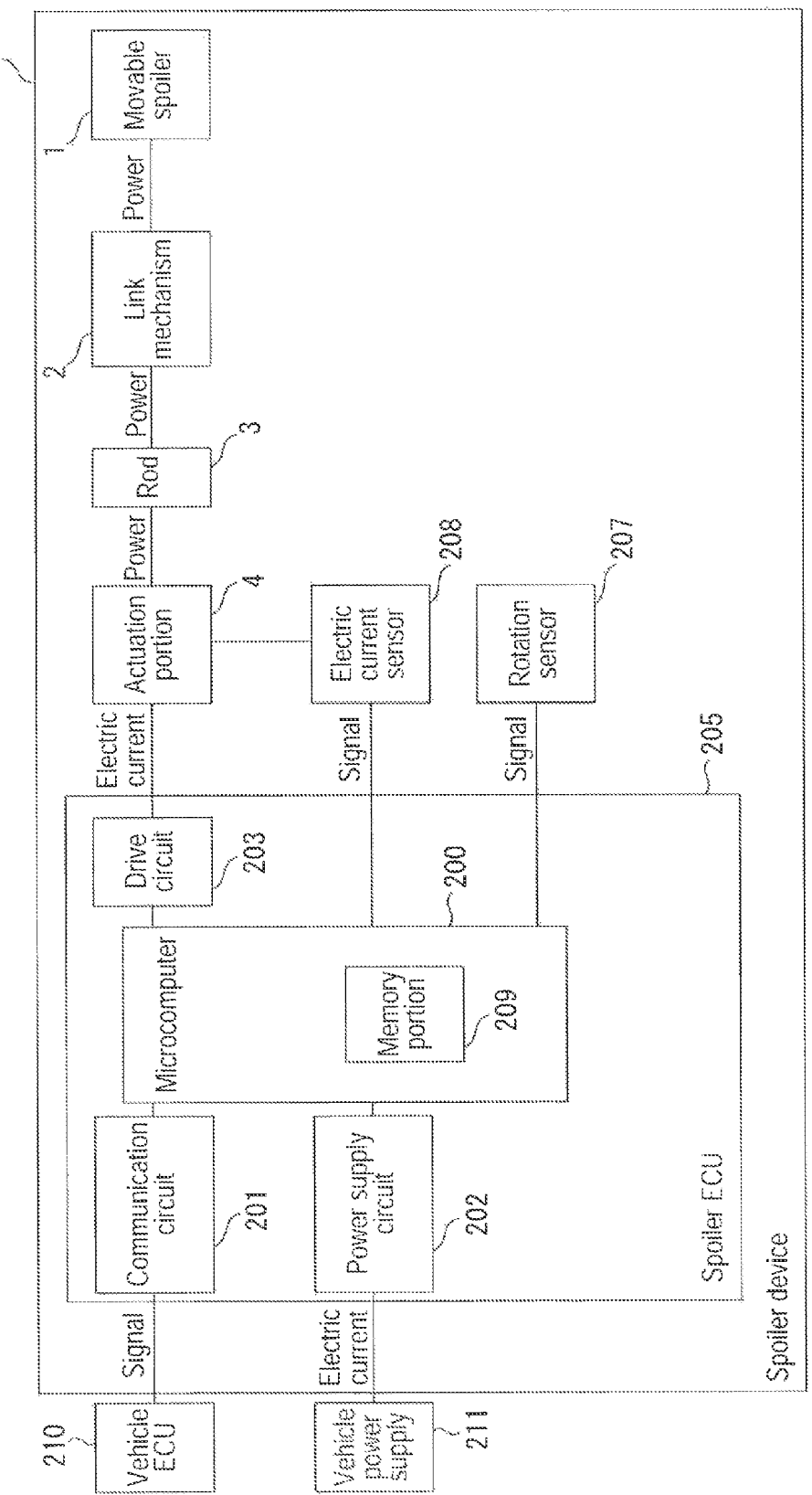
FIG. 6 is a block view showing a spoiler device according to a second embodiment disclosed here.

A spoiler device 20 according to a second embodiment will be explained with reference to FIGS. 6 and 7. In FIG. 7, a change in the operation current of the motor 40 after the operation of the movable spoiler 1 is stopped is indicated with dotted line. Differences of the second embodiment from the first embodiment will be explained hereinafter, and the same reference numerals are provided for the same elements explained in the first embodiment and the explanations will not be repeated. Further, unless otherwise described, the elements provided with the same reference numerals have the same operation, function, and the effects, or advantages.

The spoiler device 20 according to the second embodiment includes a spoiler electronic control unit (hereinafter referred to as a spoiler ECU) 205 serving as a control portion for controlling the actuation portion 4. The spoiler ECU 205 controls the actuation portion 4 to further rotate the rod 3 serving as the torsion bar after the movable spoiler 1 reaches the deployed position.

The spoiler ECU 205 includes a microcomputer 200 including a memory portion 209, for example. The microcomputer 200 controls the spoiler device 20 as a whole on the basis of a program stored in the memory portion 209, and collectively controls various transactions, for example, various computations, controls, and determinations. The microcomputer 200 can perform a control in accordance with a program stored in an external memory medium, for example, a compact disc, or a server on INTERNET.

Further, the spoiler ECU 205 includes a communication circuit 201 that transmits and receives control signals relative to (to and from) a vehicle electronic control unit (hereinafter referred to as a vehicle ECU), and a power supply circuit 202 connected to a vehicle power supply 211. Further, the spoiler ECU 205 includes a drive circuit 203 which controls an electric current applied to the motor 40 of the actuation portion 4.

Further, the spoiler device 20 includes a rotation sensor 207 which detects whether the motor 40 provided at the actuation portion 4 stops (whether the motor 40 provided at the actuation portion 4 is stopped). Various sensors, for example, a Hall IC or a positional sensor are applicable as the rotation sensor 207. Further, the rotation sensor 207 can detect the rotation number of the motor 40. Further, the spoiler device 20 includes an electric current sensor 208 which detects the operation current of the motor 40. Particularly, the electric current sensor 208 detects an electric current value obtained when the motor 40 does not move because of the excessive load, the obtained electric current value being defined as a lock electric current value.

Upon the transmission of a control signal commanding the retraction or the deployment of the movable spoiler 1 from the vehicle ECU 210 in response to the operation of a user, the microcomputer 200 receives the control signal via the communication circuit 201. The microcomputer 200 controls the drive circuit 203 to apply the electric current applied from the vehicle power source 211 to the actuation portion 4 via the power supply circuit 202. The actuation portion 4 drives the motor 40 in accordance with the applied electric current to transmit the power to the rod 3 via the arm 41. Then, the power transmitted to the rod 3 is transmitted to the movable spoiler 1 via the link mechanism 2 to move the movable spoiler 1 to the retracted position or to the deployed position.

In those circumstances, the electric current applied to the actuation portion 4 will be explained with reference to FIG. 7. FIG. 7 shows changes in the operation current applied when moving the movable spoiler 1 which is in the retracted position to the deployed position.

First, the microcomputer 200 which receives the control signal controls the drive circuit 203 to start applying the electric current to the actuation portion 4 in order to move the movable spoiler 1 which is in the retracted position to the deployed position. In consequence, the motor 40 of the actuation portion 4 rotates to move the nut portion 46 downwardly. Then, the arms 41 connected to the nut portion 46 rotate, or pivot downwardly to rotate the rod 3. Simultaneously, the connecting portion 24 and the driven link 22 are rotated, or pivotally moved via the driving link 21 connected to the rod 3 to move the movable spoiler 1 towards the deployed position.

Next, the driven link 22 comes to contact the first link stopper 26 in which the movable spoiler 1 reaches the deployed position. Thereafter, in order to rotate the rod 3 by a predetermined amount, the microcomputer 200 controls the drive circuit 203 to continue the application of the operation current to the actuation portion 4. Consequently, the motor 40 rotates to further move the nut portion 46 downwardly. Then, the arms 41 further rotate, or pivot to rotate the rod 3 in a state where the motion of the movable spoiler 1 is restricted by the first link stopper 26. Accordingly, the load applied to the motor 40 increases to increase the operation current.

Thereafter, the microcomputer 200 stops the operation of the actuation portion 4 so that the arms 41 stop rotating, or pivoting at a predetermined operation stop position. That is, the microcomputer 200 controls the drive circuit 203 to stop the application of the operation current to the actuation portion 4. Consequently, the rotation of the motor 40 stops and the downward motion of the nut portion 46 and the rotation or pivotal motion of the arms 41 stops. In those circumstances, the operation stop position is positioned between the position of the arm 41 when the movable spoiler 1 reaches the deployed position and the restricted position in which the arm 41 comes to contact the second arm stopper 44. Accordingly, the arm 41 can securely stop the motor 40 before the excessive load is applied to the motor 40 because of the contact of the arm 41 to the second arm stopper 44.

As described above, the repulsive force, or resilience of the rod 3 is applied to the driving link 21 by further rotating the rod 3 after the spoiler 1 reaches the deployed position by the control of the spoiler ECU 205. Thus, because the movable spoiler 1 can be retained by the repulsive force, or the resilience of the rod 3, the movable spoiler 1 can be securely retained at the deployed position. Further, after the movable spoiler 1 reaches the deployed position, the operation of the actuation portion 4 is stopped before the arm 41 reaches the restricted position. Accordingly, the motor 40 is prevented from being applied with the excessive load.

In those circumstances, the spoiler ECU 205 stops the operation of the actuation portion 4 on the basis of an operation stroke pre-stored in the memory portion 209 so that the rotation, or pivotal motion of the arm 41 stops at the operation stop position. Thus, the spoiler ECU 205 computes the operation stroke within a range in which the arm 41 stops after the movable spoiler 1 reaches the deployed position and before the arm 41 reaches the restricted position. Then, the spoiler ECU 205 stores the computed operation stroke for the motion of the arm 41 as an operation stroke in the memory portion 209.

For example, the memory portion 209 pre-stores the rotation number of the motor 40 which the rotation, or pivotal motion of the arm 41 requires for moving from an operation start position corresponding to the position of the arm 41 when the actuation of the actuation portion 4 starts to an operation stop position corresponding to the position of the arm 41 when the operation of the actuation portion 4 stops, as the operation stroke. Then, the microcomputer 200 determines that the arm 41 reaches the operation stop position when the rotation number detected by the rotation sensor 207 reaches the rotation number corresponding to the operation stroke, and the microcomputer 200 controls the drive circuit 203 to stop the operation of the actuation portion 4.

The operation stroke is obtained as described below. First, the microcomputer 200 controls the drive circuit 203 to drive the actuation portion 4 in a state where the arm 41 is positioned in the initial position. Thereafter, the microcomputer 200 determines whether the arm 41 has reached the restricted position. That is, the microcomputer 200 determines whether the arm 41 is positioned in the restricted position on the basis of detection results from the electric current sensor 208 or the rotation sensor 207.

More particularly, the microcomputer 200 receives the information related to the rotation number of the motor 40 from the rotation sensor 207 and determines that the arm 41 has reached the restricted position in a case where the rotation number, or rotation speed is zero. That is, when the arm 41 reaches the restricted position, the motion of the arm 41 is restricted by the first arm stopper 43 and thus the rotation of the motor 40 is stopped. Thus, in a case where the rotation number, or rotation speed is zero, it is determined that the arm 41 has reached the restricted position and the rotation of the motor 40 is stopped.

Further, the microcomputer 200 receives the information related to the operation current of the motor 40 from the electric sensor 208 and determines that the arm 41 has reached the restricted position when a value of the operation current reaches the lock electric current value. Thus, in a case where the value of the operation current reaches the lock electric current value, it is determined that the arm 41 has reached the restricted position and the motor 40 is locked.

Then, the microcomputer 200 receives the rotation number of the motor 40 from starting the operation to stopping the operation on the basis of the information related to the rotation number received from the rotation sensor 207. Further, the microcomputer 200 computes the rotation number of the motor 40 corresponding to the operation stroke by reducing a predetermined rotation number obtained considering, for example, the tolerance from the rotation number. The predetermined rotation number which is obtained considering the tolerance, for example, corresponds to, for example, a rotation number which is obtained considering variations of rotatable range, or pivotally movable range that derives from the attaching position of the arm 41, for example. The predetermined rotation number which is obtained considering the tolerance can be obtained in advance through experiments, for example.

The microcomputer 200 stores the rotation number computed in the foregoing manner in the memory portion 209. Then, when deploying the movable spoiler 1, the microcomputer 200 determines whether the rotation number detected by the rotation sensor 207 has reached the stored rotation number. Then, when the rotation number detected by the rotation sensor 207 reaches the stored rotation number, the microcomputer 200 determines that the arm 41 reaches the operation stop position, and controls the drive circuit 203 to stop the operation of the actuation portion 4.

In those circumstances, the operation stroke can be obtained at the following timings: when the production of the spoiler device 20 is completed; when the movable spoiler 1 is deployed for predetermined times; when the motor 40 rotates predetermined number of times; when a predetermined time elapses from the spoiler device 20 starts operating; and when a predetermined period elapses from start using the vehicle 100.

According to the spoiler device 20 of the second embodiment, the connecting structure of the movable spoiler 1 and the actuator 9 can be simplified. Thus, the spoiler device can be readily manufactured and the manufacturing costs can be reduced. Further, because unexpectedly entered external objects are readily removable, the sliding performance of the link mechanism 2 can be restrained from being degraded. Further, the movable spoiler 1 can be securely retained by the repulsive force, or resilience of the rod 3.

Further, the actuation portion 4 can be stopped before the arm 41 reaches the restricted position in a control for rotating the rod 3 even after the movable spoiler 1 reaches the deployed position. Further, the operation stop position for stopping the arm 41 is determined on the basis of the pre-obtained operation stroke. Accordingly, even if the rotatable range, or pivotally movable range of the arm 41 is varied, the actuation portion 4 can be securely stopped before the excessive load is applied to the motor 40.

Further, the actuation portion 4 is stopped after the movable spoiler 1 reaches the deployed position and the motion of the movable spoiler 1 is restricted. Thus, the actuation portion 4 stops in a state where the rotation speed is declined due to the application of the load to the motor 40. Thus, the arm 41 can be stopped precisely at a desired operation stop position by stopping the actuation portion 4 in a state where the rotation speed of the motor 40 is declined.

A control method of a spoiler device according to the second embodiment includes a step, or process in which the control portion (spoiler ECU 205) controls the actuation portion 4 to rotate the rod 3 in a case where a deployment signal is received. Then, the control portion (spoiler ECU 205) controls the actuation portion 4 to continue to rotate the rod 3 even after the movable spoiler 1 reaches the deployed position. Further, the step, or process for rotating the rod 3 includes a step for reading out the operation stroke of the actuation portion 4 pre-stored in the memory portion 209 and a step for determining whether the operation stroke elapses from start operating the actuation portion 4 (whether the operation stroke for the actuation portion 4 corresponding to a predetermined time or to a predetermined rotation amount of the motor 40 elapses or is obtained) by the control portion (spoiler ECU 205).

Further, a step for storing the operation stroke in the memory portion 209 includes a step for computing the operation stroke and storing the computed operation stroke in the memory portion 209. The control portion (spoiler ECU 205) computes the operation stroke for the actuation portion 4 to be within a range greater than a stroke (time or rotation amount of the motor 40) from the start of the actuation of the actuation portion 4 until the movable spoiler 1 reaches the deployed position and smaller than a stroke (time or rotation amount of the motor 40) from the start of the actuation of the actuation portion 4 until the arm 41 reaches the restricted position. The operation stroke corresponds to a time or a rotation amount of the motor 40. The control portion (spoiler ECU 205) obtains the information regarding an elapsed time or a rotation amount from the start of the operation of the actuation portion 4 until the arm 41 reaches the restricted position, and the operation stroke is computed by reducing a predetermined rotation amount from the obtained rotation amount or by reducing a predetermined time from the obtained elapsed time.

Further, the predetermined time or the predetermined rotation amount may be obtained in advance by experiments, for example, so as to be less than a necessary time or necessary rotation amount from a timing at which the movable spoiler 1 reaches the deployed position to a timing at which the arm 41 reaches the restricted position considering variations, or the like, of an attached position of the arm 41, for example. The control portion (spoiler ECU 205) determines that the arm 41 has reached the restricted position in a case where the rotation sensor 207 which detects the stop of the motor detects the stop of the motor 40 or in a case where the electric current sensor 208 which detects the operation current of the motor detects the lock electric current value.

Further, according to the second embodiment, the spoiler device 20 includes a timer. The microcomputer 200 may pre-store a time which elapses from the start of the operation of the actuation portion 4 to the stop of the operation of the actuation portion 4 as the operation stroke in the memory portion 209. In those circumstances, the microcomputer 200 determines that the arm 41 has reached the operation stop position when a time corresponding to the operation stroke elapses from the start of the operation of the actuation portion 4, and controls the drive circuit 203 to stop the actuation portion 4.

In those circumstances, the operation stroke is obtained as described below. First, the microcomputer 200 controls the drive circuit 203 to drive the actuation portion 4 in a state where the arm 41 is in the initial position. Thereafter, the microcomputer 200 determines whether the arm 41 has reached the restricted position. Then, the microcomputer 200 obtains the elapsed time from the start to the stop of the operation of the actuation portion 4 on the basis of the information related to the time obtained from the timer.

Further, the microcomputer 200 computes a time corresponding to the operation stroke by reducing a predetermined time which is obtained considering, for example, tolerance from the elapsed time. Then, the microcomputer 200 stores the computed time in the memory portion 209. When deploying the movable spoiler 1, the microcomputer 200 determines whether the time corresponding to the operation stroke elapses from the start of the operation of the actuation portion 4. Then, when the time corresponding to the operation stroke elapses, the microcomputer 200 determines that the arm 41 has reached the operation stop position, and controls the drive circuit 203 to stop the operation of the actuation portion 4.

According to an alternative construction, the spoiler ECU 205 controls the drive circuit 203 to drive the actuation portion 4 in a state where the movable spoiler 1 is in the deployed position to keep applying the rotational force directed in a reversal direction from the arrowed A direction (see FIG. 2) to the rod 3. Thus, the rotational force from the actuation portion 4 is applied in the same direction to the repulsive force of the rod 3. Accordingly, even if greater force, load is applied to the movable spoiler 1 which is in the deployed position, the movable spoiler 1 can be retained at the deployed position.

According to the embodiment, a spoiler device (10, 20) includes a movable spoiler (1) for a vehicle, the movable spoiler (1) being movable between a retracted position and a deployed position, a link mechanism (2) supporting the movable spoiler (1), a torsion bar (rod 3) connected to the link mechanism (2), and an actuation portion (4) rotating the torsion bar (rod 3).

According to the embodiment of the spoiler device (10, 20), the connecting structure of the movable spoiler (1) and the actuator, or actuation portion (4) can be simplified.

According to the embodiment, the link mechanism (2) includes a driving link (21), a driven link (22), a first link stopper (26) coming to contact the driven link (22) when the movable spoiler (1) is in the deployed position, and a second link stopper (27) coming to contact the driven link (22) when the movable spoiler (1) is in the retracted position. The actuation portion (4) includes an arm (41) connected to the torsion bar (rod 3) and being movable between an initial position and a restricted position, a first arm stopper (43) contacting the arm (41) positioned in the restricted position, and a second arm stopper (44) contacting the arm (41) positioned in the initial position. A distance between the first arm stopper (43) and the second arm stopper (44) is longer than a distance between the first link stopper (26) and the second link stopper (27).

According to the embodiment, the link mechanism (2) includes a first link stopper (26) restricting a motion of the movable spoiler (1) when moving the movable spoiler (1) to the deployed position. The actuation portion (4) includes an arm (41) connected to the torsion bar (rod 3) and being movable between an initial position and a restricted position, and a first arm stopper (43) contacting the arm (41) which is in the restricted position. A position of the first arm stopper (43) is set so that the movable spoiler (1) reaches the deployed position before the arm (41) comes to contact the first arm stopper (43) when moving the movable spoiler (1) to the deployed position. According to the embodiment, the spoiler device includes a control portion (spoiler ECU 205) controlling the actuation portion (4). The control portion (spoiler ECU 205) controls the actuation portion (4) to further rotate the torsion bar (rod 3) after the movable spoiler (1) reaches the deployed position.

According to the embodiment, the actuation portion (4) includes a reverse prevention portion (screw portion 45 and nut portion 46; worm gear mechanism) preventing a reversal rotation of the torsion bar (rod 3).

According to the embodiment, the reverse prevention portion includes a screw portion (45) rotating about a rotation shaft and a nut portion (46) threadingly engaging the screw portion (45) and moving along the rotation shaft.

According to the embodiment, the spoiler device includes a control portion (spoiler ECU 205) controlling a motor (40) provided at the actuation portion (4), and a rotation sensor (207) detecting a stop of the motor (40). The control portion (spoiler ECU 205) determines that the arm (41) is positioned in the restricted position on the basis of detected results from the rotation sensor (207).

According to the embodiment, the spoiler device includes a control portion (spoiler ECU 205) controlling a motor (40) provided at the actuation portion (4), and an electric current sensor (208) detecting an operation current of the motor (40). The control portion (spoiler ECU 205) determines that the arm (41) is positioned in the restricted position on the basis of detected results from the electric current sensor (208).

According to the embodiment, the spoiler device includes a memory portion (209) storing an operation stroke for a motion of the arm (41). The control portion (spoiler ECU 205) computes the operation stroke within a range that the arm (41) stops after the movable spoiler (1) reaches the deployed position and before the arm (41) reaches the restricted position, and the control portion (spoiler ECU 205) stores the computed operation stroke in the memory portion (209).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A spoiler device, comprising:
    a movable spoiler for a vehicle, the movable spoiler being movable between a retracted position and a deployed position;
    a link mechanism supporting the movable spoiler;
    a torsion bar connected to the link mechanism;
    an actuation portion rotating the torsion bar; and
    a control portion controlling the actuation portion;
    wherein the control portion controls the actuation portion to further rotate the torsion bar after the movable spoiler reaches the deployed position.

2. The spoiler device according to claim 1, wherein the actuation portion includes a reverse prevention portion preventing a reversal rotation of the torsion bar.

3. The spoiler device according to claim 2, wherein the reverse prevention portion includes a screw portion rotating about a rotation shaft and a nut portion threadingly engaging the screw portion and moving along the rotation shaft.

4. A spoiler device, comprising:
    a movable spoiler for a vehicle, the movable spoiler being movable between a retracted position and a deployed position;
    a link mechanism supporting the movable spoiler;
    a torsion bar connected to the link mechanism; and
    an actuation portion rotating the torsion bar; wherein
    the link mechanism includes a driving link, a driven link, a first link stopper coming to contact the driven link when the movable spoiler is in the deployed position, and a second link stopper coming to contact the driven link when the movable spoiler is in the retracted position;
    the actuation portion includes an arm connected to the torsion bar and being movable between an initial position and a restricted position, a first arm stopper contacting the arm positioned in the restricted position, and a second arm stopper contacting the arm positioned in the initial position; and
    a distance between the first arm stopper and the second arm stopper is longer than a distance between the first link stopper and the second link stopper.

5. The spoiler device according to claim 4 further comprising:
    a control portion controlling a motor provided at the actuation portion; and
    a rotation sensor detecting a stop of the motor; wherein
    the control portion determines that the arm is positioned in the restricted position on the basis of detected results from the rotation sensor.

6. The spoiler device according to claim 4 further comprising:
    a control portion controlling a motor provided at the actuation portion; and
    an electric current sensor detecting an operation current of the motor; wherein
    the control portion determines that the arm is positioned in the restricted position on the basis of detected results from the electric current sensor.

7. The spoiler device according to claim 5 further comprising:
    a memory portion storing an operation stroke for a motion of the arm; wherein
    the control portion computes the operation stroke within a range that the arm stops after the movable spoiler reaches the deployed position and before the arm reaches the restricted position, and the control portion stores the computed operation stroke in the memory portion.

8. The spoiler device according to claim 6 further comprising:
    a memory portion storing an operation stroke for a motion of the arm; wherein
    the control portion computes the operation stroke within a range that the arm stops after the movable spoiler reaches the deployed position and before the arm reaches the restricted position, and the control portion stores the computed operation stroke in the memory portion.

9. A spoiler device, comprising:
    a movable spoiler for a vehicle, the movable spoiler being movable between a retracted position and a deployed position;
    a link mechanism supporting the movable spoiler;
    a torsion bar connected to the link mechanism; and
    an actuation portion rotating the torsion bar; wherein
    the link mechanism includes a first link stopper restricting a motion of the movable spoiler when moving the movable spoiler to the deployed position;
    the actuation portion includes an arm connected to the torsion bar and being movable between an initial position and a restricted position, and a first arm stopper contacting the arm which is in the restricted position; and a position of the first arm stopper set so that the movable spoiler reaches the deployed position before the arm comes to contact the first arm stopper when moving the movable spoiler to the deployed position.

10. The spoiler device according to claim 9, further comprising:
a control portion controlling the actuation portion; wherein
wherein the control portion controls the actuation portion to further rotate the torsion bar after the movable spoiler reaches the deployed position.

11. The spoiler device according to claim 9 further comprising:
a control portion controlling a motor provided at the actuation portion; and
a rotation sensor detecting a stop of the motor; wherein
the control portion determines that the arm is positioned in the restricted position on the basis of detected results from the rotation sensor.

12. The spoiler device according to claim 9 further comprising:
a control portion controlling a motor provided at the actuation portion; and
an electric current sensor detecting an operation current of the motor; wherein
the control portion determines that the arm is positioned in the restricted position on the basis of detected results from the electric current sensor.

13. The spoiler device according to claim 11 further comprising:
a memory portion storing an operation stroke for a motion of the arm; wherein
the control portion computes the operation stroke within a range that the arm stops after the movable spoiler reaches the deployed position and before the arm reaches the restricted position, and the control portion stores the computed operation stroke in the memory portion.

14. The spoiler device according to claim 12 further comprising:
a memory portion storing an operation stroke for a motion of the arm; wherein
the control portion computes the operation stroke within a range that the arm stops after the movable spoiler reaches the deployed position and before the arm reaches the restricted position, and the control portion stores the computed operation stroke in the memory portion.

* * * * *